Sept. 3, 1935.  W. A. McLEAN  2,013,316
AUTOMATIC VALVE
Filed June 26, 1933

INVENTOR
William A. McLean
BY
his ATTORNEY

Patented Sept. 3, 1935

2,013,316

UNITED STATES PATENT OFFICE 2,013,316

AUTOMATIC VALVE

William A. McLean, Rochester, N. Y., assignor to C. Schnackel's Son, Inc., Rochester, N. Y., a corporation of New York Application June 26, 1933, Serial No. 677,646

2 Claims. (Cl. 251—114)

My present invention relates to the distribution of liquids, such as the functions of pipe lines in pumping or circulatory systems, and it has for its general object to provide an improved automatically acting valve that will function to produce a substantially uniform predetermined flow of liquid under varying pressures as the impelling force therefor. The improvements are directed in part toward providing a comparatively simple valve of this character that may be produced at low cost but which will so react to varying and particularly excessively pumping pressures working behind it that it will not overload the capacities of the mechanisms to which delivery is made.

To these and other ends, the invention resides in certain improvements and combinations of parts, all as will be hereinafter more fully described, the novel features being pointed out in the claims at the end of this specification.

In the drawing.

Similar reference numerals throughout the several views indicate the same parts.

Figure 1:
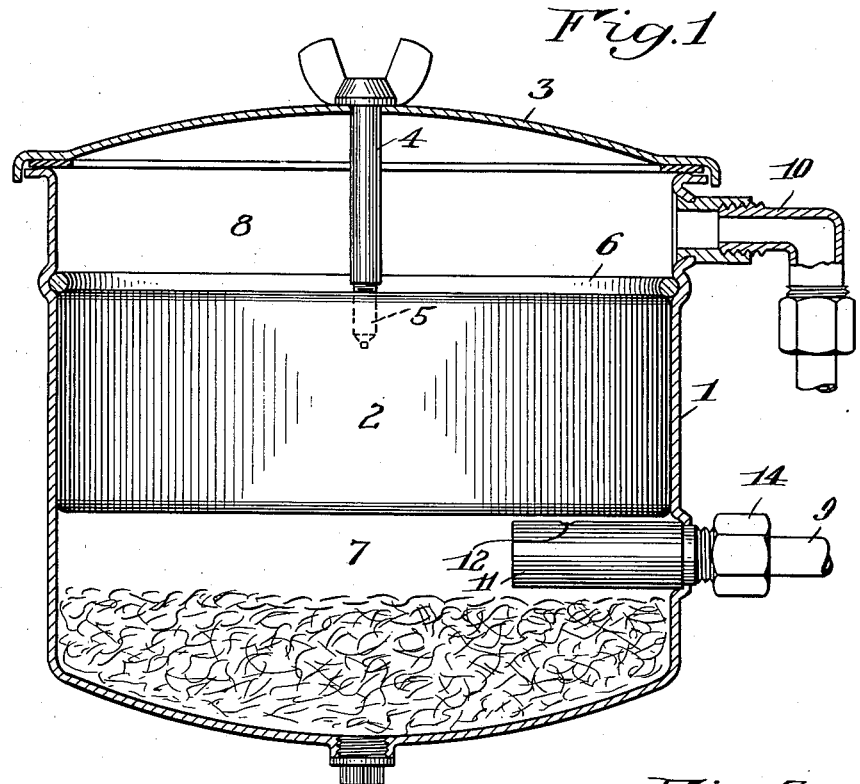
Fig. 1 is an elevation of a valve constructed in accordance with and illustrating one embodiment of my invention, the same being shown attached to a lubricating system to control the feed through an oil filter and illustrative of one useful application thereof.

In the accompanying illustrations, I have shown my invention applied to an oil filter in the line of the circulatory lubricating system of an internal combustion engine. The oil filter shown is of the nature disclosed in my copending application, Serial No. 658,696, filed February 27, 1933. The details of its structure and mode of operation per se are not important to this disclosure beyond the fact that it comprises a container 1 confining a filtering body 2 in the form of a removable and replaceable cartridge. A cover 3 is clamped to the container by a bolt 4 threaded into the cartridge 2 at 5, which cartridge is held in place by a spring ring 6. This forms an inlet chamber 7 below the filtering medium and an outlet chamber 8 above it. An inlet pipe 9 takes into the chamber 7 and, being connected to the oil pump, forces the oil through the filter 2 to chamber 8 and out through a pipe 10 leading therefrom to the bearings of the engine or other part or parts to be lubricated.

In the operation of such a system, the problem is to maintain a proper level and pressure of oil in chamber 8 and a feed therefrom through pipe 10 that will be adequate for the lubricating demand without straining the cover 5 and practically regardless of the size of pipe 10. The problem arises from the fact that pumps on different engines vary in capacity and produce different feed pressures and it is impracticable to use different sized pipes for the different systems. With my invention, in its present and other applications, the volume of the feed is rendered constant irrespective of the pumping pressure. Beyond this, the valve element that I employ is of such a nature that its regulatory work is unhampered to a practical extent by the presence of solid impurities in the oil that necessarily traverse such valve element before the oil body in which they are contained reaches the purifying influence of the filter itself.

Figure 2:
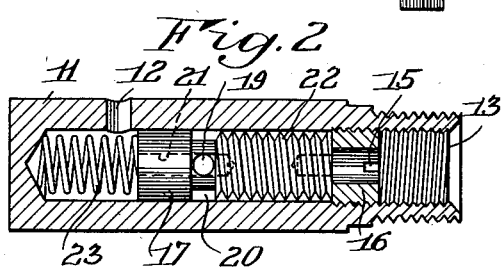
Fig. 2 is an enlarged central longitudinal sectional view through the valve and its casing with the parts shown in the positions occupied at a relatively low pumping pressure.
Figure 3:
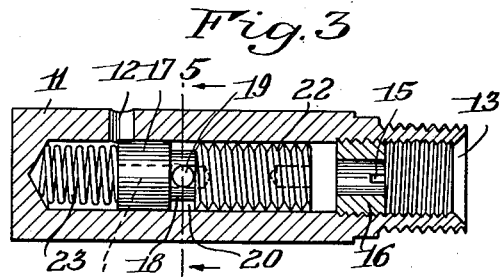
Fig. 3 is a similar view with the parts in the positions they occupy under a relatively high pumping pressure.
Figure 5:
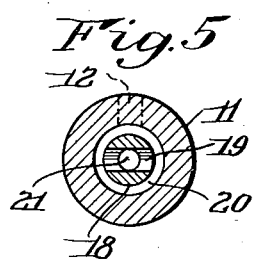
Fig. 5 is a cross section taken substantially on the line 5—5 of Fig. 3, viewed in the direction of the arrows.
Figure 4:
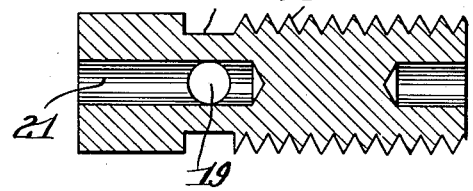
Fig. 4 is a further enlarged central longitudinal section through the movable valve element itself.

Again referring in detail to the drawing, 11 indicates a valve shell or casing in the pumping line mounted in container 1 to project into chamber 7 and having an outlet 12 delivering into the latter. At its outer end, which embodies an inlet opening 13, it is fitted with a suitable union, indicated generally at 14, by means of which is attached the inlet pipe 9 connected to the oil pump or other source of feed pressure (not shown). Threaded into the inlet opening 13 (as by means of spanner sockets 15) is a tubular plug 16 that confines a vibratory or reciprocatory valve element 17, the piston-like head of which is indicated by the last mentioned reference numeral. Back of this head is a reduced portion 18 pierced by a transverse bore 19 constituting a lateral port communicating with an annular space between the valve member and the casing shell 11, which space is indicated at 20. The bore or port opening 19 is intersected axially of the valve member or plunger by a bore 21 forming a port opening on the face or crown of the piston head 17, which latter, as is apparent, is in the position to partially or wholly cut off or else leave open the outlet 12. The base or body of the valve member 17 still further back of the reduced portion 18 is exteriorly threaded at 22 to ride in peripheral contact with the inner walls of the cylinder-like shell 11. Between the head or crown of the latter and the piston head 17 is interposed a spring 23, the normal tendency of which is to hold the outlet port 12 open, as in Fig. 2, so far as the piston head is concerned. With this construction in mind, the operation is as follows:

The oil pressure through the pipe 9 from the pump or other source passing through the tubular plug 16 applies itself against the threaded base face of the valve member, being resisted against movement of the latter by the spring 23. Instead, at least initially, the oil winds its way around the coarse threads 22, reaching the annular chamber 20. From thence it passes through transverse port 19 in the valve member to the axial port 21 and the spring chamber in the head of the shell from which it escapes through outlet 12 in the shell and takes its regular filtering course to chamber 8, ultimately escaping through discharge pipe 10. Should, however, the pumping pressure be too great to be relieved by the tortuous passage of the oil around threads 22, so that such pressure builds up behind the valve member 17, the latter will move within the shell, bodily, from the position of Fig. 2 to that of Fig. 3, causing the piston head 17 to partially close outlet port 12 for the time being. It must be remembered, however, that during this time the pressure in the chamber occupied by spring 23, as communicated to it by ports and passages 21, 19, 18 and 22, is hydraulically equal to that elsewhere, in addition to which a relieving or opening movement of the valve piston 17 is assisted by the tension of spring 23 as normally exerted. Therefore, as soon as the discharging capacity of outlet 12 in emptying this chamber permits, the valve will be thrust to an opening movement by the spring and the normal flow into the spring chamber will be resumed.

Attention is called to the fact that, outside of the spring 23, there are only two relatively movable elements in my unit, namely, the sliding valve 17 and its shell or casing 11 and because of the screw threaded contour of the body portion of the valve at 22 it will, during its reciprocations under varying pressures, keep itself free from what would otherwise be fouling impurities in the oil stream. By this I mean that the restricted oil passage formed by the threads 22 is subject to constant agitation and the ports and passages 20, 19, 21 and 12 beyond it are so large and free that there is little liability of clogging or resistance to free movement at other points.

I claim as my invention:

1. In an automatic valve of the character described, the combination with a shell having inlet and outlet openings, of a sliding valve member therein adapted to close the outlet opening under fluid pressure from the inlet, said valve member comprising as an integral unit a piston head functioning as such closure, a reduced portion back of such head, a screw threaded periphery of the diameter of the head back of such reduced portion, a transverse port in the latter, and a passage leading from the latter port to the piston head, and a spring interposed between the end of the shell and the piston head.

2. In an automatic valve of the character described, the combination with a shell closed at one end and having an inlet opening at the open end, said shell being provided with a lateral outlet opening, of a sliding valve member therein adapted to close the outlet opening under fluid pressure from the inlet, said valve member being provided with a restricted tortuous passage leading to the outlet opening constituted by screw threads on the periphery thereof in sliding contact with the shell walls, a spring acting between the closed end of the shell and valve member tending to operate the latter to an open position with respect to the outlet opening, and a perforated plug in the inlet opening holding all of the interior parts in place, said interior parts being capable of assembly by passing them one after the other in proper order through the inlet opening.

WILLIAM A. McLEAN.